United States Patent [19]

Crownover

[11] 4,164,087

[45] Aug. 14, 1979

[54] AUTOMOBILE ORNAMENT

[76] Inventor: Frederick S. Crownover, Rte. 1, Box 27, Columbiana, Ala. 35051

[21] Appl. No.: 805,148

[22] Filed: Jun. 9, 1977

[51] Int. Cl.² ............................................. G09F 21/04
[52] U.S. Cl. ......................................... 40/492; 40/591
[58] Field of Search ................ 40/591, 592, 492, 497, 40/2.2, 10 R, 1.5, 1.6, 587, 327

[56] References Cited

U.S. PATENT DOCUMENTS

| | | | |
|---|---|---|---|
| 1,314,745 | 9/1919 | Hahn | 40/2.2 |
| 2,289,228 | 7/1942 | Warner | 40/591 |
| 2,503,988 | 4/1950 | Arbib | 40/587 X |
| 2,543,605 | 2/1951 | Smith | 40/591 |
| 3,381,495 | 5/1968 | Emerson | 40/492 |
| 3,822,494 | 7/1974 | Zivica | 40/160 |
| 3,949,506 | 4/1976 | Benkowski | 40/1.6 |

*Primary Examiner*—John F. Pitrelli
*Assistant Examiner*—G. Lee Skillington
*Attorney, Agent, or Firm*—FredericL. Bergert

[57] ABSTRACT

A hoop-shaped device for displaying information such as the name of a football or basketball team is disclosed. A ball-shaped member is attached to the center portion of the device, and this ball member may be convertible from the shape of a football to that of a basketball, for example. A series of creases are provided in the hoop portion for ease of installation on uneven surfaces.

6 Claims, 3 Drawing Figures

AUTOMOBILE ORNAMENT

BACKGROUND AND SUMMARY OF THE INVENTION

The present invention is concerned with a hoop-shaped device for attachment to an automobile or other location. More particularly, the present invention is concerned with a display item in the form of a hoop-shaped device having the general circular configuration of a ring or hoop, with a ball member such as a football or basketball molded in a center rim of the device which extends across the midportion of the hoop. Lettering or other indicia may be placed on the outer circular hoop portion of the device to provide information such as the name of a football or basketball team.

Various devices having messages or other indicia thereon and with means for attachment to autombiles and other locations are known in the prior art, such devices being described, for example, in U.S. Pat. No. 3,200,524 to Hendrickson and in U.S. Pat. No. 2,525,001 to Sherwood. In the Hendrickson patent, there is described a safety tail light in the form of a small round device having advertising or other lettering thereon, with the device being attached by means of bolts to an automobile. The Sherwood device is a circular ornamental configuration having lettering thereon and mountable on an automobile.

By the present invention, there is provided an improved hoop-shaped device for attachment to any of various locations on automobiles, trucks or any other suitable location upon which it is desired to provide an attractive display item as described herein. The hoop-shaped device of the present invention, which may be called Sport-O-Hoop, is provided in its center portion with a ball-shaped member in the form of a football or basketball. In one alternative, the ball shaped member is in the form of a football, with expansion means for expanding into the shape of a basketball. The device of the present invention is further provided with creases around the periphery of the hoop for purposes of easy shaping and pliability.

BRIEF DESCRIPTION OF THE DRAWINGS

The advantages and features of the hoop-shaped device of the present invention will be more fully understood from the following description of the preferred embodiments, taken in conjunction with the accompanying drawings, wherein.

DESCRIPTION OF THE PREFERRED EMBODIMENTS

Figure 1:
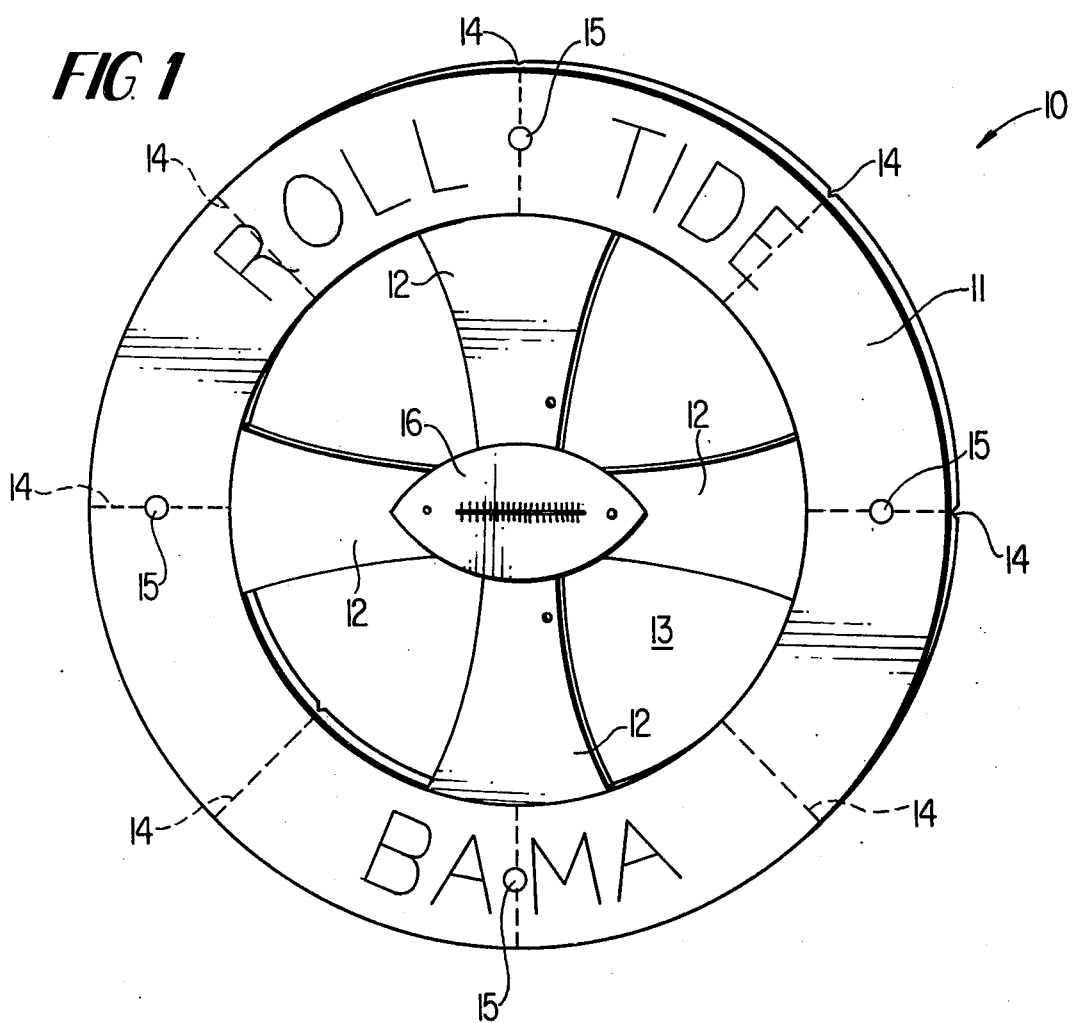
FIG. 1 is a perspective view of the hoop-shaped device of the present invention.
Figure 2:
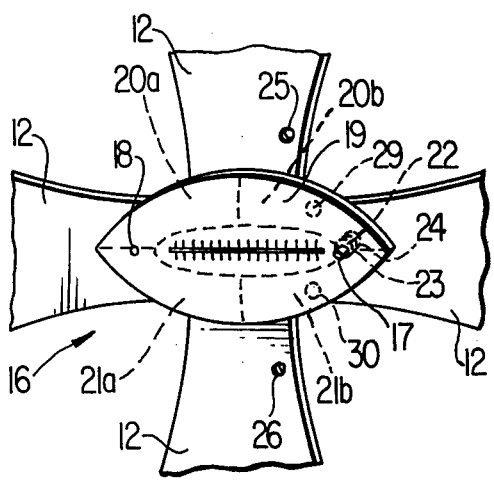
FIG. 2 is an enlarged partial elevational view showing an alternative embodiment of the device of FIG. 1.
Figure 3:
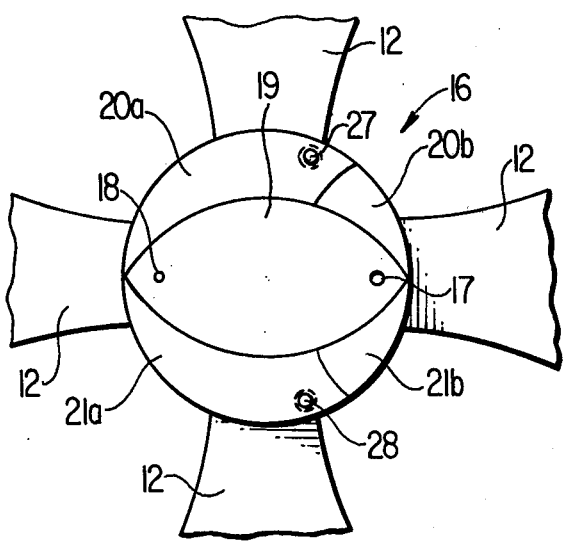
FIG. 3 is an enlarged elevational view showing the ball-shaped member of FIG. 2, but with the member having been expanded into a basketball configuration.

In the embodiment of the present invention as illustrated in FIGS. 1 through 3, there is provided a hoop-shaped device 10 which includes a circular hoop-shaped outer member 11 having inner webs 12 which extend across the cutout center portion 13 located interiorly of the hoop 11. The device 10, including the outer member 11, webs 12 and the ball member, to be described hereinafter, may be formed of plastic or other similar durable material.

A plurality of creases or grooves 14 are provided at intervals around the circumference of the hoop-shaped member 11 and these creases 14 extend diametrically across the width of the hoop 11 and contribute to the ease of shaping and pliability of the device 10 when attaching the device to the surface of an automobile or other object, particularly a surface which is curved or otherwise uneven, as such surfaces often are in the case of automobiles, trucks, boats and the like.

The creases 14 may be of a depth such as approximately one-third to two-thirds the thickness of the hoop member 11. Creases 14 formed at intervals of about 45 degrees have been employed with good results. Such creases 14 may be formed in a conventional manner suitable indentations in the mold during molding of the device 10, for example. In addition, punch out plugs 15 are provided at approximately 90 degrees intervals around the circumference of the hoop-shaped member 11. These plugs 15 may also be formed by suitable indentations in the mold during manufacture. The plugs 15 are held in the device by only a small portion of the thickness of the hoop 11, with the result that the plugs 15 may be easily punched out and removed, thus allowing bolts and other securing devices to be inserted through the holes formed by the plugs 15.

At the center portion of the intersection of the web members 12, there is attached thereto a ball-shaped member 16. The ball-shaped member 16 may take the form of a football or basketball, for example, and may be employed with accompanying indicia in the form of lettering around the circumference of the hoop-shaped member 11 to indicate, for example, a football or basketball team which is of particular interest in the area in which the device is to be sold.

In an alternative embodiment of the present invention, the ball-shaped member 16 is provided with means for changing the shape of the ball-shaped member 16. Thus, as shown in FIG. 2, the ball-shaped member 16 is in the shape of a football with outer leaf 19 representing the football and being pivotally attached to the web 12 by pin 18. Additional leaves 20, 21 are also pivotally attached to the web 12 by pin 18 and these leaves 20, 21, which are under the outer leaf 19, are rotated about pin 18 so as to be behind the outer leaf 19. Each leaf 20, 21 includes a pair of overlapping slidably engaging segments which allow the leaves 20, 21 to be repositioned to form a basketball shape. Thus leaf 20 includes overlapping segments 20a and 20b while leaf 21 includes overlapping segments 21a and 21b.

A spring activated pin 17, operable in conjunction with spring 22, is secured to the outer leaf 19. This pin 17 is so constructed as to releasably fit through holes 23 in the leaves 20, 21 into hole or detent 24 in the web 12 which is adjacent said pin 17. Upon the pin 17 being manually pulled outwardly from the hole 24 against the pressure of spring 22 and from holes 23, the leaves 20, 21 may then be repositioned by sliding the segments 20a, 20b and 21a 21b relative to each other to the positions shown in FIG. 3, with the result that a basketball-shaped ball member 16 is provided. In this position, holes 25 and 26 are provided in the upper and lower webs 12 for insertion of separate pins 27, 28 to maintain the leaves 20, 21 in the basketball configuration. These pins 27, 28 also pass through holes 29, 30 in the leaves 20, 21. The release of spring operated pin 17 will allow this pin to re-enter hole 24 to maintain the center leaf 19 in position.

Thus, as described herein, the present invention provides a hoop-shaped device having a football or basketball initially molded in the center portion, or, alternatively, with the ball-shaped member 16 being constructed so as to be convertible either to a football or basketball. In the case where the football, basketball or other ball-shaped member is initially molded as part of the device, without the convertible feature, it may be desirable to use only two web members 12 extending either horizontally or vertically relative to the device 10.

The hoop-shaped device 10 of the present invention may be bolted to the surface to which it is to be attached, using bolts or similar attaching means which are installed through the holes formed by the punch out plugs 15. In attaching the device by the use of bolts, the punch out plugs 15 are pushed out, leaving holes through which the bolts may fit, with the bolts also being passed through corresponding holes in a bumper or other location and with the bolts being secured by the use of nuts in a conventional manner. It may be desirable to use relatively large size nuts, particularly when attaching the device 10 to the grille of an automobile or the like.

As an alternative attaching means, the back of the device 10 may be provided with a gummed surface having a protective paper applied thereto. Upon peeling off the protective paper, the device may then be adhesively secured to the desired surface.

In either case, whether applied by bolts, adhesive backing or other means, the creases 14 assist in providing sufficient pliability to make the device 10 easily attachable, even on uneven surfaces.

The device 10 of the present invention may be manufactured in any convenient size such as, for example, a diameter of 4 inches 6 inches or 10 inches. Examples of suggested uses include: adhesively securing the device 10 to the truck of an automobile or to the back of a truck; either adhesively securing or bolting the device 10 onto a wheel disc of an automobile or truck; bolting the device to the grille of an automobile or truck; bolting the device to the front or back bumper of an automobile or truck; or adhesively securing the device to the side of a boat, automobile or the like.

It is thought that the invention and many of its attendant advantages will be understood from the foregoing description, and it will be apparent that various changes may be made in form, construction and arrangement of the parts without departing from the spirit and scope of the invention or sacrificing its material advantages, the forms hereinbefore described being merely the preferred embodiments thereof.

It is claimed:

1. A hoop-shaped device for displaying information in the form of words or other indicia, comprising: a hoop-shaped member having indicia provided thereon, a plurality of web members extending from said hoop-shaped member across the central open portion of the hoop to intersect at the midpoint of said open portion, a ball-shaped member having the silhouette of a game ball attached at the intersection of said web members, and a plurality of grooves provided at intervals around the circumference of said hoop-shaped member, whereby pliability of the device is increased and the attachment to a support means facilitated, said grooves extending diametrically across the width of said hoop-shaped member.

2. The device of claim 1, wherein said ball-shaped member is provided with means for converting said ball-shaped member from the shape of a football to the shape of a basketball.

3. The device of claim 2, wherein four of said web members are employed, said web members being spaced at equal angles around the interior portion of said hoop-shaped member.

4. The device of claim 1, wherein said grooves are of a depth of approximately $\frac{1}{8}$ to $\frac{3}{8}$ of the thickness of the hoop-shaped member and wherein said grooves are provided at intervals of about 45 degrees around the circumference of the hoop-shaped member.

5. The device of claim 1, wherein punch out plugs are provided at approximately 90 degree intervals around the circumference of the hoop-shaped member.

6. The device of claim 1, wherein said ball-shaped member includes a plurality of leaf members pivotally connected by a common pin to said web members, at least one of said leaf members being provided with a pair of overlapping slidably engaging segments which may be repositioned to form the shape of a basketball or football.

* * * * *